UNITED STATES PATENT OFFICE.

NATHANIEL C. FOWLER, JR., OF BOSTON, MASSACHUSETTS.

FOOD COMPOSITION AND METHOD OF MAKING THE SAME.

1,182,263.  Specification of Letters Patent.  Patented May 9, 1916.

No Drawing.  Application filed June 23, 1914.  Serial No. 846,889.

*To all whom it may concern:*

Be it known that I, NATHANIEL C. FOWLER, Jr., a citizen of the United States, residing at Allston, Boston, in the county of Suffolk and State of Massachusetts, have invented new and useful Improvements in Food Compositions and Methods of Making the Same, of which the following is a specification.

This invention relates to improvements in food compositions and methods of making the same.

More particularly it relates to preparations of food whether or not having ingredient oil or fat, adapted to be marketed as is now customary with cereals and breakfast foods, and to be useful either for immediate consumption or as an ingredient in baked or otherwise cooked articles of food.

It is an object of the invention to provide a food which may have definite physiological values, predeterminate by selection of ingredients having known properties, and which will keep for a long period of time under ordinary conditions, without the assistance of any chemical or other preservative ingredient and without special pains being taken to exclude it from contact with the atmosphere.

Hitherto the public have not been provided with any food product that is available and feasible for consumption in large quantities and has the above good keeping qualities, except grain or cereal products.

It is one object of the present invention to enlarge vastly the range of materials that are available as a basis for manufacture of nutritive products of the sort described, thus making a substantial contribution to the problem of reducing the cost of living; and also, by multiplying the number of possible varieties in such manufactured nutritive products of this enriched quality, to make a food adequate for uses for which cereals alone are manufactured, thus further offering a solution to the problem of the cost of living, because of its possible substitution to some extent for more expensive foods for which cereals alone could never be a substitute.

It is a further object to produce such food compositions from relatively inexpensive ingredients and by a method that is so inexpensive that the cost of the final product is low.

In seeking to accomplish these objects, by the method of the invention herein set forth it has been discovered that a composition, made with a combination of ingredients according to the invention and without the addition of any chemical preservative, has better keeping qualities than those same ingredients have separately from the combination, and also better effect upon the digestive organs.

The preservation of the composite product of cereals and fruit is effected by grinding or comminuting the materials to an exceedingly fine degree and then sterilizing and drying the particles. Because of the fineness of their pulverization, or the thinness of the particles, it is possible thus to sterilize them completely, and to remove the possibility of germ life recurring, so far as it depends on moisture, by a removal of moisture so thoroughgoing that it may fairly be said to be an absolute removal of all moisture; and yet this does not entail that conversion of the material into shriveled, hardened and inedible form which results when an attempt is made to dry larger bodies of food completely. But such drying process, while extracting all the moisture, does not extract the oils or fats if these be present; and it is the purpose hereof to set forth a method by which food material is kept from becoming rancid by chemical or bacterial change of its oils or fats when exposed to the atmosphere. It is also probable that the method herein described has some preservative effect upon the starches that may be present in the food material.

In the specific illustration here given to show how the invention may be applied, cornmeal is taken as typical of a food material having fat or oil, and starch. A formula that will illustrate the invention is as follows: Taking equal parts of cornmeal, wheat-bran and prunes. The cornmeal and wheat-bran are to be mixed together; a quantity of water, equal in weight to about ¼ of the weight of the total mixture of meal and bran, added thereto; and the whole then subjected to heat in a covered vessel for a period of about twelve hours. The temperature is preferably about the boiling point of water or a little higher. The heat may be conveniently supplied by steam, by which means a uniform temperature may be maintained in the receptacle of about the degree mentioned. The prunes, having been cleansed and freed from stones, are added to the mass which has thus been cooked and, if desired, a flavoring may be added, provided that a flavoring be selected, of which salt is an example, that is capable of surviving the presence of water into which it may go in solution, and subsequent evaporation of the water. Salt, to the extent of about one-half of one per cent. of the weight of the three main ingredients above mentioned, may also be added, but this is for the purpose of rendering the product palatable rather than because of any effect upon its nutritive or digestive or keeping qualities. The mass of cereals and fruit is then thoroughly mixed and ground until the individual parts of each ingredient are very finely comminuted and each ingredient is distributed uniformly throughout the mass. The degree of comminution is important, and should be exceedingly fine.

It is a feature of the invention that this process should be carried out under pressure, in order to realize most effectively the benefits with respect to the constituent oils or fats. This may be easily done by the use of any suitable food grinding apparatus, a typical form of which is the well known and common food chopper (or sausage machine), having a metallic screw or worm feed, within a conical casing terminated by a perforated plate through which the product is discharged. In such a machine the worm or screw forces the material forward against the perforated plate and compresses it, while the rubbing of the blade end of the screw upon the surface of the plate grinds and cuts the material. The whole mass is confined under such pressure that a glutinous substance is expressed from the fruit and is smeared generally over the ingredients, and particularly over the cornmeal particles, so that such particles are smoothed over with the glutinous substance. This makes an envelop around each particle. The mixture may be put through such a grinder several times, or may be put through different grinders successively, provided with progressively finer perforations. When it is put through the same grinder repeatedly, the first passing through makes a general mixing, and the cutting is into relatively coarse sizes. When the material is again passed through the apparatus the fruit ingredient disappears. This is especially noticeable where the fruit ingredient contains prunes, because of the black skins, which have been easily distinguishable in the mass; but the cutting becomes so fine at this stage, the mixture so complete, and the covering with glutinous matter so thorough, that the distinctive blackness of these skins is lost in the general aspect of the mass. The material discharged from the perforations of the plate issues in the form of spiral rods which break easily. The more times the mixture is put through the machine the less easily do these masses break apart. For ordinary purposes, a third submission to the action of such apparatus is sufficient, the final form being in short curly rods. The material is then spread thinly upon pans and subjected to a drying and sterilizing heat for a sufficient period to drive off all moisture with great completeness. Ordinarily a heat of 225 degrees Fahrenheit, continued for three hours, is sufficient for this, although the length of time requisite may depend in part upon the form of the comminuted mass. In this drying the rod-like masses that were spread upon the drying pans become somewhat further broken, leaving the material more or less granular in aspect, the granules being porous because each individually consists of an aggregation of an immense number of very fine particles adhering to each other, with such spaces between them as may happen to be formed.

It is essential that the drying be very complete; but the arrangement into granules and the particular shape of the granules or small masses in which the food composition ultimately appears is of no particular consequence and may be varied at will. In the course of the drying the coating of glutinous matter hardens and forms a shell or screen covering and protecting the cornmeal particles as well as other particles which it envelops. This hardened envelop thus surrounds and keeps air from the granules in which the fat and oils are held, and from the starch granules, and prevents oxygen and germs in the atmosphere from reaching the fats and oils and starches. The glutinous substance of the envelop does not constitute food for the germs; and it does not readily absorb moisture from the air. Yet it is digestible. In the preliminary heating the cereal ingredients were thoroughly sterilized; in the subsequent drying process the sterilization was applied also to the fruit ingredient, so that the completed product became thoroughly sterile and covered by a hard sterile germ-resistant protective envelop; and, in the preferred form, these very minute protected particles are found adhering together in small masses, so that the product presents a gritty granular aspect which is a powerful stimulant of saliva and of the digestive juices, but affords no harbor or sustenance for germ life which may come to it through the atmosphere, prior to its being soaked in milk or cream or water.

While cornmeal, bran and prunes have been taken as illustrative of materials with which the process of the invention may be used, it will be observed that the process is not dependent upon the selection of any particular ingredients, but that any other suitable ingredients may be added, or may be substituted; and also that the ingredients may be combined in any desired proportions.

Certain benefits of the process relate more particularly to those food ingredients having constituent oil and fat which will not be driven off by the simple drying process and which therefore are liable to become "spoiled" by continued exposure. For the fruit ingredient, apricots, peaches, apples and raisins have been tried and have worked well in place of the prunes; and it is believed that any fruit from which pectin is obtainable might be used with greater or less success.

It will be observed that the process does not require the addition of sugar or syrups or any liquid flavor or preservatives. The product may be eaten in the prepared state, as above described, in which case its dryness coöperates with its solid, granular form to act as a powerful stimulant to the saliva glands; or it may be eaten with the addition of cream and sugar, or salt, or otherwise, according to taste. The presence of a substantial proportion of fruit in the product gives it a satisfying quality to the appetite, so that a meal may be made from this alone with a considerable degree of satisfaction under conditions where the provision of supplies or facilities for eating are difficult or restricted; or where the person does not find it convenient to leave his occupation for formal eating. It is believed that the product when prepared with ingredients selected according to prescription suitable to the case, may also be found valuable in helping cases of intestinal indigestion; and particularly there is reason to believe that when eaten with buttermilk it may prove effective in combating intestinal putrefaction germs.

When it is to be eaten as a breakfast cereal, the process of causing it to exude through apertures as above described, before drying, is preferably employed because the product then in its final form assumes a granular aspect, which stimulates chewing without being too solid or tough. Another way in which the product may be formed for the market, if desired, is by pressing it into cakes before or after it has gone through the drying process above described and these cakes may be, for example, of the size of small grains or may be in the size or shape of dice or dominoes, or larger. Instead of being eaten in this state the product may be further prepared before consumption by using it as a flour, in which case it may be mixed with corn meal or oat meal or other preparations of grain for cooking, or may be mixed with other food ingredients for cooking. When so mixed preparatory to cooking it usually becomes incorporated in the body of the other material without its presence being particularly noticeable to the eye. In some cases, as when it is to be used with self-rising flour, it has been found that the product of the above formula does not mix as well as with others; but in such cases the product may be first mixed with bran and the mixture thus produced may then be mixed satisfactorily with the self-rising flour or other similar food.

The product above described has been found by experiment to be so thoroughly sterile that it not only contains no perceptible germ life of any sort, but it repels the existence of such if its introduction be attempted, or if the product be left standing in positions where ordinary grains or dried fruits would soon deteriorate owing to the development of germ life therein. The high degree of comminution to which the ingredients are subjected permits the moisture-expelling process to be so exceedingly thorough that the moisture is believed to be expelled not only from the interstices between the small particles and from the exteriors of such particles but also from the internal substance thereof. Notwithstanding the extreme dryness of the ingredients in the final form of the product, it is found that this dryness does not interfere with any desired use of the food because, being so finely comminuted, it quickly absorbs moisture from the mouth and can be eaten, whereas in whole form or in large particles it could not. The combination of coarse and of fine granular form above described is particularly valuable both with respect to the process of manufacture and with respect to the use of the product as a food. This is true in the first instance because the spaces between the very small individual particles permit ready expulsion of liquids from each individual particle; and is true in the second instance because these same minute spaces facilitate the passage of liquid among the particles, in cooking or in mastication, to each of them. Yet, at the same time, the adherence of these very small particles together in small masses, each of which as a whole constitute one grain in the general granular structure, produces larger openings through the mass of food as a whole, through which the moisture expelled from the interstices in each such composite grain may easily escape from the mass; and through which moisture, when the food is used, may readily enter to each composite grain and so have access readily to the minute passages leading to the individual finely comminuted particles or smaller grains which compose such grain.

In practising the process according to the best manner, the drying of the finely comminuted fruit is carried to such an extent as would render the fruit inedible, if the fruit were dried, to that degree of completeness, either whole, or in single portions of the sizes heretofore practised. For the perfection of the process it seems preferable that nuts be avoided as ingredients, unless a fruit ingredient is also used by which a pectin casing is provided as above explained, because so far as my experiments have gone the oil therein is not perfectly expellable and such remnant of oil as remains therein may become rancid. When the bran is used as one of the ingredients the fineness of comminution above specified may not be fully attained in form although it be attained in effect, because it will be found that any particles of bran which appear to be larger are really so thin that they will dry with the same thoroughness as the other particles.

It will be obvious that the comminution may be obtained by the use of any suitable machinery; and that the heating and drying may be applied by other means than as above described. In that stage of the process in which the first heating is effected, the water which has been added serves to cook the cereal portion of the product and this action, being carried out in the presence of water and at a temperature above the boiling point of water, kills all germs. Subsequent dry cooking of the fruit in intimate relation with the grain, which originally has some degree of moisture, the moisture gradually lessening as this cooking step proceeds, continues the sterilizing process and secures digestibility. The result is a product, having all the nutriment of grain and all the nutriment of fruit, which may be manufactured at a central plant and prepared for sale in various forms and for various uses, will keep for a very long time under ordinary commercial and living conditions, and can be used as a food either in its rather firmly granular form, so as to require chewing, or in pulverized form as a flour or as an ingredient with flour in edible products. In selecting the grain and fruit ingredients regard may be had either to the cost or to the nutritive or digestive values, or to other considerations, the particular grains and fruits named being mentioned as examples. It will be noted that the word "prune," which is the fruit ingredient described herein, indicates a fruit product which is already "dried," in the commercial sense, although not at all dry according to the standard prescribed herein, but this illustrates the fact that if the fruit used be some product which is commercially known as dry, such as prunes or dried apples, the process goes forward quite as well as, if not better than, when fresh fruit is used.

The best method of comminuting is believed to be by grinding, but the word "grinding" is used in the claims with a broad meaning, signifying comminution to the very fine degree which can be attained by grinding, whatever be the specific machinery by which the comminution is attained.

I claim as my invention:

1. A process for preservation of foods consisting of grinding together, to a state of exceedingly fine comminution, food ingredients that are free from added fatty and oily constituents, sterilizing the ground material by heat and drying the finely divided component particles of the said material completely without roasting, in a manner permitting direct escape of moisture from each small particle.

2. A process for preservation of food consisting of grinding food material very fine; arranging the very fine individual particles in small granular masses each composed of a quantity of said particles adhering together and having spaces between them through which moisture may escape from those within; and driving off by heat all free moisture from the particles in their finely divided state; the said finely divided particles being subjected to sterilizing heat at some time during the process.

3. A process for preparation of foods consisting of placing a cereal ingredient in a covered vessel with a small proportion of water, exposing the vessel to steam heat for a number of hours, adding a fruit ingredient, mixing and grinding the mass together to a very fine degree and then exposing the material to heat in open vessels for a number of hours thereby drying it, the material at some time in the process being subjected to heat of sterilizing temperature.

4. A process for preparation of foods consisting of a mixture of portions of corn meal and wheat bran; the addition of a small proportion of water; cooking the mixture for a period of hours; the addition of about an equal portion of prunes; the addition of salt for flavor; grinding of the whole to a very fine degree, raising of the whole to a sterilizing temperature and drying it thoroughly by heat.

5. A process for preservation of food consisting in the selection of fruit and cereal ingredients free from added fatty and oily juices, grinding the said materials to a state of exceedingly fine comminution, mixing them together with a proportion of the cereal at least approximately equaling the proportion of fruit, arranging them so that moisture can readily escape from all of the very small individual particles and pass out from the mass, and drying the individual particles thus arranged, sterilizing heat being applied at some time during the process.

6. A process for preparation of a composite food consisting in the selection of cereal and fruit ingredients, partially drying the fruit in mass, grinding both dried fruit and cereals to a state of exceedingly fine comminution and mixing them together, with a proportion of the cereal at least approximately equaling the proportion of fruit, and subjecting the finely ground particles to dry heat until practically all moisture has escaped from the composite mass, sterilizing heat being applied at some time during the process.

7. A food composition adapted to be eaten in solid form without further preparation consisting of a mixture of vegetable products arranged in the form of very finely divided particles, the individual particles being sterile without being carbonized and being approximately absolutely free from moisture and thereby adapted to keep for a long period of time under ordinary conditions without added preservative.

8. A food composition adapted to be eaten in solid form without further preparation consisting of a mixture of cereal and fruit products, there being at least approximately as much cereal as there is fruit, both being arranged in the form of very finely divided particles, the individual particles being sterile and approximately absolutely free from moisture and thereby adapted to keep for a long period of time under ordinary conditions without added preservative.

9. A food composition adapted to be eaten in solid form without further preparation consisting of a mixture of cereal and fruit products, there being at least approximately as much cereal as there is fruit, both being arranged in the form of very finely divided particles, the individual particles being sterile and approximately absolutely free from moisture and thereby adapted to keep for a long period of time under ordinary conditions without added preservative, said particles being arranged adhering lightly together in small porous formations of groups of granular aspect.

10. A food composition comprising the combination of corn meal, bran and fruit ingredients, with components derived from both the insoluble and the soluble parts of the original ingredients, the said composition being divided into exceedingly small particles, and said particles being sterile and approximately absolutely dry.

11. A food composition comprising a mixture of cooked cereal and fruit products, containing no added preservative material, and characterized by freedom from moisture; permanence of form by reason of abnormal ability to resist germ invasion, as compared with ordinary cooked products; edibility; and laxative quality.

12. A process for preparation of foods, including the comminuting of a fruit ingredient under pressure and to a very fine degree in combination with a food ingredient of oily characteristic, whereby the comminuted particles become individually incased in a glutinous substance expressed from the fruit; and then the applying of dry heat.

13. A process for preparation of foods, including the cooking of cereal ingredients, including one of oily characteristic, in a covered vessel with a small proportion of water for a number of hours; adding a fruit ingredient to the product; mixing and grinding the mass together to a very fine degree of comminution, under pressure sufficient to express a glutinous material from the fruit, thereby incasing the comminuted particles with said glutinous material; and then applying heat till the product is dry and the said incasing material water-soluble.

14. A process for preparation of foods, including the mixture and comminution under pressure of fruit and other food ingredients containing an oily constituent, thereby incasing the oily particles in a glutinous material expressed from the fruit ingredient; sterilizing and drying the product.

15. A process for preparation of foods, including the mixture and comminution under pressure of fruit and other ingredients containing an oily constituent, thereby incasing the comminuted particles in a pectin material expressed from the fruit ingredient; and heating the product, thereby drying the finely comminuted particles and leaving the pectin casing in hard, water soluble condition.

16. A food composition comprising a combination of fruit and other food ingredients including an ingredient having an oily characteristic, the whole being very finely comminuted, dry, sterile, and having its comminuted particles incased in a hardened glutinous product of the fruit.

17. A food composition including a combination of fruit and other food ingredients very finely comminuted, sterile, unroasted and dry and with the comminuted particles incased in a germ resistant pectin ingredient.

Signed by me at Boston, Mass., this 13th day of June, 1914.

NATHANIEL C. FOWLER, Jr.

Witnesses:
JOSEPH T. BRENNAN,
EVERETT E. KENT.